US012198547B2

(12) United States Patent
Pearl

(10) Patent No.: US 12,198,547 B2
(45) **Date of Patent: *Jan. 14, 2025**

(54) DETERMINING AND COMMUNICATING HAZARDOUS ROAD CONDITIONS TO USERS

(71) Applicant: DISH Wireless L.L.C., Englewood, CO (US)

(72) Inventor: Cary A. Pearl, Aurora, CO (US)

(73) Assignee: DISH Wireless L.L.C., Englewood, CO (US)

( * ) Notice: Subject to any disclaimer, the term of this patent is extended or adjusted under 35 U.S.C. 154(b) by 251 days.

This patent is subject to a terminal disclaimer.

(21) Appl. No.: 17/750,355

(22) Filed: May 22, 2022

(65) Prior Publication Data

US 2022/0284811 A1 Sep. 8, 2022

Related U.S. Application Data

(63) Continuation of application No. 16/994,929, filed on Aug. 17, 2020, now Pat. No. 11,367,351.

(51) Int. Cl.
*G08G 1/0967* (2006.01)

(52) U.S. Cl.
CPC .............................. *G08G 1/096783* (2013.01)

(58) Field of Classification Search
CPC ................................................ G08G 1/096783
See application file for complete search history.

(56) References Cited

U.S. PATENT DOCUMENTS

| | | | | |
|---|---|---|---|---|
| 10,068,473 | B1 | 9/2018 | Harrison et al. | |
| 10,222,773 | B2 * | 3/2019 | Funk | H04W 4/38 |
| 11,322,033 | B2 * | 5/2022 | Dow | B64C 39/024 |
| 2005/0062617 | A1 | 3/2005 | Dalgleish | |
| 2008/0275644 | A1 | 11/2008 | MacNeille et al. | |
| 2010/0207787 | A1 * | 8/2010 | Catten | G08G 1/096716 340/905 |
| 2011/0282627 | A1 | 11/2011 | Jang et al. | |
| 2012/0078509 | A1 * | 3/2012 | Choi | G01C 21/3415 701/423 |
| 2014/0067265 | A1 * | 3/2014 | Maston | G01C 21/3697 340/905 |
| 2014/0340239 | A1 * | 11/2014 | Wyble | G08G 1/096783 340/905 |

(Continued)

*Primary Examiner* — Mohamed Barakat

(74) *Attorney, Agent, or Firm* — Wash Park IP Ltd.; John T. Kennedy

(57) ABSTRACT

Systems, devices, and processes are provided for determining road conditions and communicating hazardous conditions to drivers. A system may include a first sensor, located along a first portion of a road, configured to: output a first reading, of a first detector, indicative of a first condition; and a controller node configured to determine, based on the first reading, whether a hazardous condition potentially exists along the first portion of the road and output a first warning message. A process for detecting a hazardous condition may positioning a sensor along a road; determining a current sensor location, determining a detector location; specifying a threshold for the condition; specifying a warning; activating the sensor; determining whether a current reading from the detector exceeds the threshold; and generating a warning.

19 Claims, 3 Drawing Sheets

(56) References Cited

U.S. PATENT DOCUMENTS

| | | | | |
|---|---|---|---|---|
| 2015/0161540 | A1* | 6/2015 | Akselrod | G06Q 10/06311 705/7.13 |
| 2018/0165526 | A1 | 6/2018 | Yoon et al. | |
| 2020/0342753 | A1* | 10/2020 | Arndt | G08G 1/054 |
| 2021/0065473 | A1* | 3/2021 | Diehl | G01S 13/931 |

* cited by examiner

DETERMINING AND COMMUNICATING HAZARDOUS ROAD CONDITIONS TO USERS

CROSS-REFERENCE TO RELATED APPLICATIONS

This application is a Continuation of and claims priority to U.S. patent application Ser. No. 16/994,929, filed on 17 Aug. 2020, in the name of inventor Cary A. Pearl, and entitled, "DEVICES, SYSTEMS AND PROCESSES FOR DETERMINING AND COMMUNICATING HAZARDS ROAD CONDITIONS TO USERS," the entire contents of which are incorporated herein by reference.

TECHNICAL FIELD

The technology described herein generally relates to devices, systems, and processes for determining conditions of roads and/or other surfaces. The technology described herein also generally relates to the communicating of conditions of roads and/or other surfaces to users. Such users may be humans or automated systems, such as, autonomous and semi-autonomous vehicles.

BACKGROUND

Today, operators of motor vehicles often encounter black-ice, suddenly slick road conditions, unpassable or minimally passable road conditions, and the like (herein, "hazardous conditions"). Such hazardous conditions may arise without warning and may result, if not traversed with due caution, in injury to persons and/or property. Operators of vehicles may include humans and autonomous/semi-autonomous operators, including but not limited to self-driving cars and trucks. While hazardous conditions may arise with respect to roads, bridges, underpasses, tunnels, and the like, similarly hazardous conditions may also arise with respect to other areas, such as on lakes, at sea, on sidewalks, trails, ski runs, or otherwise. As used herein and for purposes of clarity and simplified description, one or more locations at which hazardous conditions may arise with respect to a vehicle, of any type, a pedestrian, or otherwise, are each referred to herein as a "road." Hazardous conditions may adversely effect a traversing of a given road by vehicles, bicycles, pedestrians, trucks, busses, trains, boats, or otherwise (herein, such persons, operators, entities or otherwise seeking to traverse a road are identified as "users"). When provided forewarning, users can often safely traverse or avoid traversing roads with hazardous conditions without incurring undue risks, damage and/or injury to person or property, or other potential or actual harms. Accordingly, devices, systems, and processes for determining when hazardous conditions are likely to arise on a road, or portion thereof, and warning users of such hazardous conditions are needed.

SUMMARY

The various embodiments of the present disclosure relate in general to devices, systems, and processes for determining hazardous conditions with respect to one or more portions of a road. The various embodiments of the present disclosure also relate to the communication of such hazardous conditions to users.

For at least one embodiment of the present disclosure, a system may include a first sensor, located along a first portion of a road, configured to output a first reading, of a first detector, indicative of a first condition. The system may also include a controller node, communicatively coupled to the first sensor, configured to: receive the first reading; determine, based on the first reading, whether a hazardous condition potentially exists along the first portion of the road; and output a first warning message when the hazardous condition is determined to potentially exist.

For at least one embodiment, the controller node may be further configured to: determine, based on the first reading, whether the hazardous condition exists along the first portion of the road; and output a second warning message when the actual hazardous conditions is determined to exist.

For at least one embodiment, the controller node may be further configured to generate only the second hazard warning message, and not the first hazard message.

For at least one embodiment, the first sensor may be further configured to output a second reading, from a second detector, indicative of a second detected condition. The controller may be further configured to: receive the second reading; determine, based on the first reading and the second reading, whether the potentially hazardous condition exists along the first portion of the road; and output the potential hazard warning message when the potentially hazardous condition is determined to exist.

For at least one embodiment, the first detector may include a humidity detector and the first reading may be a humidity level. The second detector may include a thermometer and the second reading may be an air temperature reading. The controller node may be configured to determine that a fog hazardous condition potentially exists along the portion of the road when the first reading indicates that the humidity level is at the dew point and the second reading indicates that the air temperature is within two-point-five degrees Celsius (2.5° C.) of a dew point.

For at least one embodiment, the first sensor may be further configured to output a third reading, from a third detector, indicative of a third detected condition. The third detector may include a camera and the third reading may include a current image of visible light conditions at the portion of the road. The controller node may be configured to determine that a fog hazardous condition actually exists along the portion of the road when the first reading indicates that the humidity level is at the dew point, the second reading indicates that the air temperature is within two-point-five degrees Celsius (2.5° C.) of a dew point, and the third reading indicates that the visible light conditions warrant speeds of less than a given threshold.

For at least one embodiment, a given threshold may include a vehicle driving speed of less than fifty kilometers per hour (50 KPH).

For at least one embodiment, the first condition may include whether moisture is present on the portion of the road. The first sensor may be further configured to output a second reading, from a second detector, indicative of a second condition. The second detector may include a road surface temperature detector and the second condition may include whether a current road temperature is at or below the freezing point. The controller node may be configured to determine that a black-ice hazardous condition potentially exists along the portion of the road when the first reading indicates the first condition exists and the second reading indicates the second condition exists.

For at least one embodiment, the system may include a warning sign, communicatively coupled to the controller node, configured to generate a first warning for the first user based on the first warning message. The warning sign may be further configured to generate a second warning for the first user based on the second warning message. The warning sign may be a highway message board.

For at least one embodiment, the system may include a user device, associated with a user then traversing or soon expected to traverse the portion of the road. The user device may include a processor configured to execute computer instructions for a travel application program. The travel application program may be configured to determine a current location of the user device. The travel application program may be configured to receive one or more warnings from the controller node. The one or more warnings may include a message to be presented by the travel application program when the user device is at or within a given distance of the portion of the road. The travel application program may be configured to, based upon a received warning from the controller node and the current location of the user device, present a corresponding warning to the user. The corresponding warning may be presented in the form of at least one of an audible format, a visible format, and a text format. The hazardous condition may be based upon at least one of a weather hazard, an atmospheric hazard, and an environmental hazard.

In accordance with at least one embodiment of the present disclosure, a process, for detecting at least one hazardous condition along a portion of a road, may include one or more operations of: positioning a sensor along a portion of road; determining a current location of the sensor, as positioned along the portion of the road; determining a location of a detector associated with the sensor, wherein the detector is configured to generate a reading indicative of a condition; specifying a threshold for the condition; specifying a warning; wherein the warning is based on when the reading from the detector exceeds the threshold for the condition; activating the sensor; determining whether a current reading from the detector exceeds the threshold; and generating a warning, wherein the warning is generated when the current reading exceeds the threshold.

For at least one embodiment, the process may further include configuring a sensor to execute computer instructions for performing at least one of the operations of: specifying the threshold for the condition; specifying the warning; determining whether the current reading form the detector exceeds the threshold; and generating the warning.

For at least one embodiment, the process may further include configuring a controller node to execute computer instructions for performing at least one of the operations of: specifying the warning; determining whether the current reading form the detector exceeds the threshold; and generating the warning.

For at least one embodiment, the process may further include operations of presenting the warning to a user of a vehicle traversing the portion of the road. The warning to the user may be presented using at least one of a highway message board, a text message, and travel application program.

In accordance with at least one embodiment of the present disclosure, a sensor may include a first detector configured to output a first reading indicative of a first condition. The sensor may also include a second detector configured to output a second reading indicative of a second condition. The sensor may also include a storage module configured to store at least one of a first threshold, a second threshold, a first warning message, a second warning message, and a third warning message. The sensor may also include a communications module configured to communicatively couple the sensor with a warning sign. The sensor may also include a processor, communicatively coupled to the first detector, the second detector, the storage module, and the communications module, configured to execute one or more non-transient computer instructions for at least one operation for" first determining whether the first reading exceeds the first threshold; second determining whether the second reading exceeds the second threshold; and outputting for presentation to a user using the warning sign at least one of: the first warning message when the first reading exceeds the first threshold while the second reading does not exceed the second threshold; the second warning message when the second reading exceeds the second threshold while the first reading does not exceed the first threshold; and the third warning message when each of the first reading exceeds the first threshold and the second reading exceeds the second threshold. For at least one embodiment, the first warning message warns of fog conditions. For at least one embodiment, the second warning message warns of freezing conditions. For at least one embodiment, the third warning message warns of black-ice condition.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1:
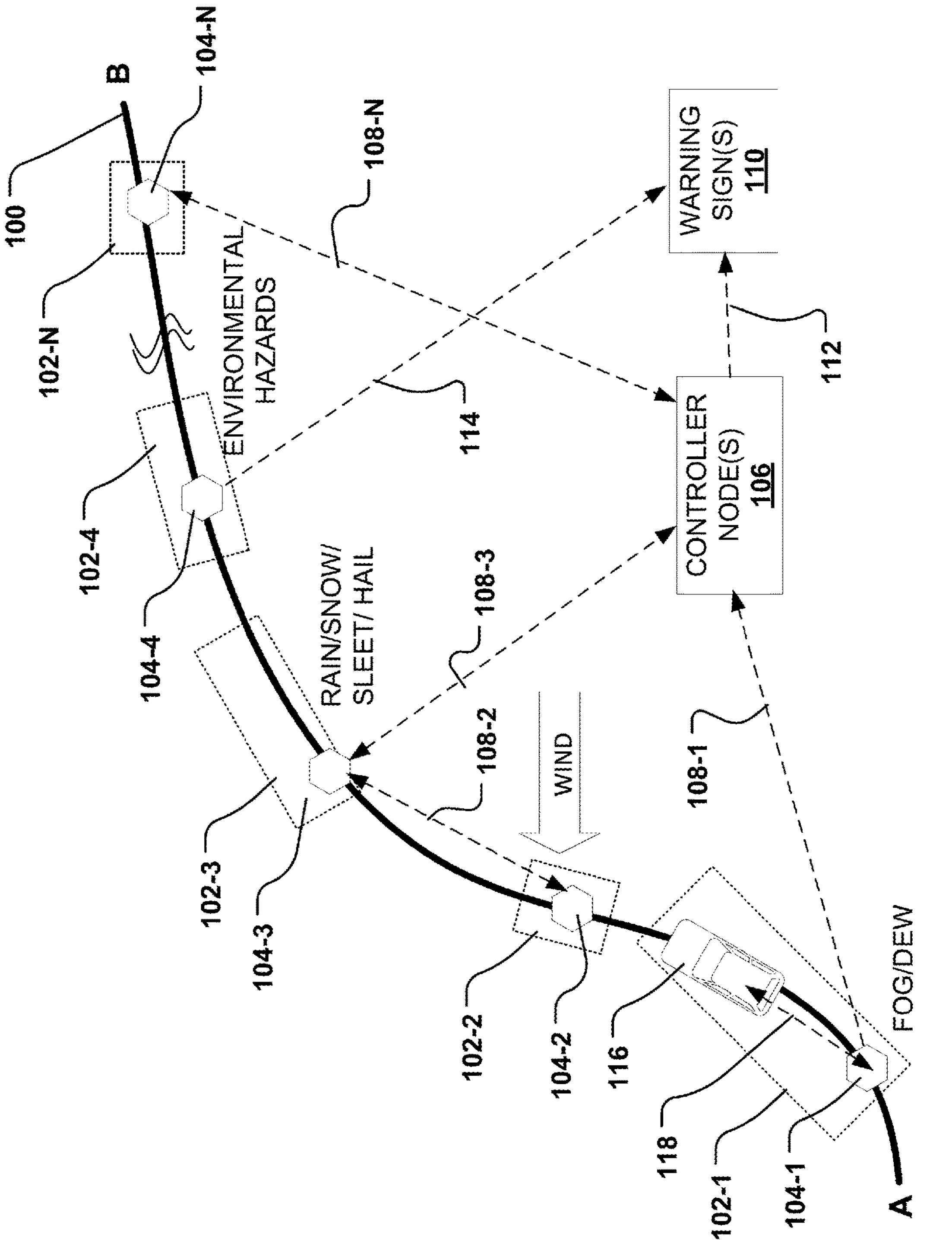
FIG. 1 is a schematic diagram of a system configured in accordance with at least one embodiment of the present disclosure to facilitate the detection and communication of actual and/or potential hazardous conditions on one or more portions of a road to at least one user.

The various embodiments described herein are directed to devices, systems, and processes for determining actual and/or potentially occurring hazardous conditions with respect to one or more portions of a road and communicating such hazardous conditions to at least one user. As used herein, "hazardous conditions" may arise due to one or more identifiable conditions. Such conditions may include, but are not limited to, weather conditions, atmospheric conditions, environmental conditions, or otherwise. Conditions may arise with respect to one or more portions of a road, where such one or more conditions may impede, make impossible or impractical, render unsafe, present obstacles, or otherwise infer, inhibit, impact, or the like a traversing of one or more portions of a road by a user. Such conditions may be identifiable as presenting one or more "hazards." Effects of such hazards, whether actual or potential, may be minimized, negated, avoided, overcome, warned, or otherwise addressed (herein, collectively "mitigated") by providing proper warnings and, when possible, advice to users regarding a given hazard and any corrective or other actions that may be taken to mitigate the hazard(s).

It is to be appreciated that a hazardous condition may arise due to "weather hazards." Non-limiting examples of weather hazards include rain, snow, sleet, hail, wind, and the like.

Hazardous conditions may arise due to "atmospheric hazards." Atmospheric hazards may arise with or without the presence of weather hazards. Non-limiting examples of atmospheric hazards include fog and black-ice. As is well known, black-ice may form on a road when the dew point is reached and the air temperature is below the freezing point of water. Fog, black-ice, and other atmospheric hazards may often form unexpectedly and without warning from meterologists or otherwise. Atmospheric hazards may often occur on a highly localized basis, for example, along stretches of a road of less than ten (10) miles, and with respect to certain portions, but, not all portions of a road surface between two more locations. As used herein, "freezing conditions" generally refer to the temperature at which water freezes at one atmosphere of pressure, which is commonly referred to as zero degrees Celsius (0° C.). It is appreciated that the freezing point of water varies slightly with altitude and decreased atmospheric pressure. Such variances, however, are negligible for purposes of the present disclosure and thus for purposes of this disclosure a 0° C. freezing point is assumed for all road conditions.

Further, it is to be appreciated that an area of high humidity is generally defined as an area of the Earth where the presence of water vapor in the atmosphere is greater than seventy percent (70%). Under high humidity conditions, and when the temperature falls (such as in the evening and at night), the atmosphere may reach the "dew point"—which is generally defined as the temperature at which the air needs to be cooled (at a constant pressure) in order to achieve a relative humidity of one-hundred percent (100%). When the dew point is reached, the air cannot hold more water in the gas form and, thus, water (a.k.a., "dew") commonly forms on roads and other surfaces. It is to further appreciated that when dew is present and freezing conditions then or later occur, such dew may form into black-ice. Further, when the difference between the air temperature and the dew point is less then two-point-five degrees Celsius (2.5° C.), fog may form.

Further, hazardous conditions may arise due to "environmental hazards." As used herein, an "environmental hazard" includes any hazard that is not a weather hazard or an atmospheric hazard. Non-limiting examples of environmental hazards include vehicle accidents, rock falls, road repair, road construction, chemical spills, avalanche conditions, the presence of toxins, or the like which may arise and/or effect a user and/or a vehicle.

Regardless of its form, a hazard arises from one or more conditions. Many of such conditions may be detectable using known devices, sensors, technologies, and the like. The various embodiments of the present disclosure utilize any known and/or later arising devices, systems and processes which facilitate the detection of hazards and communicating of such hazardous conditions to users. Such communications may include warnings, recommendations, computer instructions (such as those provided to and for control of autonomous vehicles), and/or required actions a user may (or must) take in response to the hazard, or otherwise. For example, detection and identification to users of hazards such as extreme cold—as may occur in Alaska—or extreme heat—as may occur in Death Valley, California, and may be desired to encourage a user to take appropriate precautions, such as having a full tank of gas, extra water, blankets, or the like, before a user begins traversing a given portion of a road. The various embodiments of the present disclosure facilitate such detection and communication of actual and/or potential hazards.

As shown in FIG. 1 and with respect to at least one embodiment of the present disclosure, a system may be provided for identifying hazards that may arise along a road 100 between a first location A and a second location B. The road 100 may include numerous portions, such as a first portion 102-1, a second portion 102-2, a third portion 102-3, a fourth portion 102-4, and one or more Nth portions 102-N. The portions 102-1/N may be contiguous or separated by any measurable distance. One or more of the portions 102 may be identified based upon prior observations or determinations of actual and/or potential hazards. One or more of the portions 102 may be determined on an ad hoc basis. One or more first portions may have characteristics which vary from one or more second portions. Such characteristics may be constant and/or fixed and may give rise to actual and/or potential hazards at anytime, all the time, seasonally, or on any other basis.

For example, a first portion 102-1 may be located in an area susceptible to atmospheric hazards such as fog and black-ice. A second portion 102-2 of the road 100 may be located in an area that is susceptible to certain weather hazards, such as high-winds (seaonsal or otherwise). A third portion 102-3 of the road 100 may be located, for example and not by limitation, at a higher altitude, in a norther latitude, or in an area that is susceptible certain weather hazards such as snow, sleet, hail, and the like. A fourth portion 102-4 of the road 100 may be located in an area that is susceptible to environmental hazards. It is to be appreciated that a given portion may be subject to one or more of the weather and/or atmospheric hazards, from time to time, as arising with respect to the the above mentioned hazards discussed with respect to the 1$^{st}$ thru Nth portions, and/or to other hazards.

In accordance with at least one embodiment of the present disclosure, one or more sensors 104 may be used to detect hazardous conditions and/or environments susceptible and/or ripe for the formation of such hazardous conditions. The one or more sensors 104 may be embedded in the road portion, adjacent to the road portion (for example, provided on a highway road sign post), or otherwise located at a desired location for a given portion 102 of a road 100. For at least one embodiment, a location of a sensor 104 may be fixed, for example, at a time of installation. The location of the fixed sensor 104 may be determined at the time of installation or at another desired time. For at least one embodiment, a location of a sensor 104 may vary. For example, a sensor 104 may be provided on a movable platform, or the like. For a non-fixed location sensor 104, a location of such sensor 104 at a given time may be determined using known location determination techniques, devices, and systems, a non-limiting example being the Global Positioning System. Other location determination technologies may be used, as desired for a given embodiment such as mile post markings on roadways, distances from known points, such as bridges or overpasses, or otherwise.

In accordance with at least one embodiment, sensor(s) 104 may be used to monitor conditions for one or more actual and/or potential hazards including, but not limited to, weather hazards, atmospheric hazards, environmental hazards, and otherwise. For example and not by limitation, a first sensor 104-1 may be used to monitor the first portion 104-1 for at least one of, if not both, conditions ripe for the formation of and the actual occurrence of various atmospheric hazards, such as fog and freezing dew forming black-ice. To detect such atmospheric hazards and for at least one embodiment, the first sensor 104-1 may be configured to monitor the humidity level and temperature of the atmosphere at one or more locations within the first portion 102-1 of the road.

For at least one embodiment, a hazardous condition may be detected, by a sensor 104, to exist when one or more measured and/or determinable parameters (such as temperature and humidity level) exceed a pre-determined, variably determined, fixed, programmable, or other threshold. As used herein, to exceed a threshold means that the measured and/or determined parameter is greater or lesser than a given threshold, as the case may be. For example, when a sensor 104 is provided to detect conditions ripe for black-ice and other freezing related hazards, a temperature reading of less than 0° C. threshold for a given period of time, such as two (2) minutes, may be considered to exceed the threshold.

For at least one embodiment, a sensor 104 may be configured to detect conditions ripe for one or more hazards based upon a combination of two or more detected and/or determined sensor readings. For example, a concern with black-ice formation may require a sensor 104 to detect both freezing conditions for a given time period during which the humidity exceeds a given threshold or a threshold range, such as a humidity level greater than ninety-five percent (>95%).

Other hazardous conditions may also be monitored, as desired for a given implementation, such as weather hazards including wind speed and otherwise. It is to be appreciated that one or more sensors 104 may be used to detect one or more hazards with respect to one or more portions 102 of the road 100.

As further shown a second sensor 104-2 may be configured and used to detect one or more weather hazards, such as wind hazards. As used herein, a wind hazard is generally considered to be defined based on characteristics of a given road portion. Such characteristics may include one or more of, e.g., is it straight, banked, winding, the posted speed limit, and otherwise. A wind hazard may also and/or alternatively be defined based on characteristics of the wind itself, such as direction, sustained speed, gust speeds, maximum gust speeds and otherwise, and the like. Other characteristics may be used in defining a given hazard, such as whether a detected wind hazard includes rain, snow, sleet, dust, dirt, tumbleweeds, or otherwise. Other thresholds may be used for any given portion of the road 100. For example, a road portion on a tight curve or on a banked road that is perpendicular to a predominate wind direction may result in a use of lower wind thresholds triggering hazardous condition detections by a sensor 104. Contrarily, when the wind is a head-wind, higher wind thresholds may be used before a hazardous condition is detected. Likewise when the wind includes rain, snow, dust, or other vision inhibiters, a lower wind speed threshold might be used to detect a hazardous condition. It is thus to be appreciated that a given implementation of a senor 104 with respect to a given location and a given portion of a road may vary from another implementation. The conditions monitored to determine whether a hazard exists, or whether conditions may be ripe for such a hazard to arise, may vary as may the detection thresholds used for any given sensor 104 vary. Such detection thresholds may be adjustabled, fixed, or otherwise. As further shown, a third sensor 104-3 may be configured and used to detect other weather hazards, such as depth of snow on a road surface, whether standing water is present on the road surface, or the like. As further shown, a fourth sensor 104-4 may be configured to detect environmental hazards. At least one embodiment of the sensors 104 is further described herein below and shown in FIG. 2.

As further shown in FIG. 1, the various sensors 102-1/N may be communicatively coupled to one or more controller nodes 106 by one or more communications links 108, such as a first communications link 108-1, a second communications link 108-2, a third communications link 108-3 and an Nth communications link 108-N. It is to be appreciated that the same or different controller nodes 106 may be used for receiving readings from one or more sensors 104 and, based on such readings, detecting and identifying hazardous conditions with respect to one or more portions 102 of the road 100 and generating any desired warnings.

Controller Node 106

Non-limiting examples of controller nodes 106 may include traffic and/or highway controller nodes operated by Departments of Transportation for cities, states, countries, regions, or otherwise—one non-limiting example being the Colorado Department of Transportation.

For at least one embodiment, one or more databases used by a controller node 106 may be centralized, distributed, fixed, portable, or otherwise configured. Databases may be configured to store "readings" (as defined below), "determinations" (as defined below), results arising from the processing of readings and/or determinations (herein, "controller data"), and any other information desired for any implementation of any of the embodiments of the present disclosure. As used herein, "controller data" refers to outputs generated by a controlled node 106 based on data processing operations performed thereby with respect to detected data and/or determined data, as such data is received from one or more sensors 104. The configuration and use of databases is well known in the art and any presently available and/or later arising database systems, architectures, protocols, or otherwise may be utilized in one or more embodiments of the present disclosure.

For at least one embodiment, the controller node 106 may include one or more networking technologies, such as the Internet, running one or more communications protocols thereon, such as the hyper-link text transport protocol and other protocols which supports the dissemination of data and other information across the Web, to one or more warning signs 110 (as discussed below), and otherwise. It is to be appreciated that any local, distributed, or combinations thereof network and/or interconnecting technologies, protocols, mediums, or otherwise may be utilized in accordance with one or more embodiments of the present disclosure.

For at least one embodiment, the controller node 106 may include at least one processor. For at least one embodiment, a processor may be provided in a networked computing system, a mainframe computer, a desktop computer, a personal computer, a tablet, or any other computing device having one (1) or more processing threads executing on one (1) or more cores at 1.7 ghz (speed) and capable of executing 1 MIPS (one million instructions per second). Further, the processor may be configured to include one or more sets of computer code which configure the controller node 106 to perform one or more operations and/or sets of instructions, such as the algorithms and operations described herein, which facilitate the detection and communication of hazardous conditions to users.

The controller node 106 may use any known or later arising data processing, computing, storing, and/or user interfacing devices, technologies, and/or systems. Such technologies may arise in any desired computing configuration including, but not limited to, local, remote, distributed, blade, virtual, or other configuration and/or with use of any devices and/or systems configured for use in support of the one or more embodiments of the present disclosure. The controller node may also include one or more databases which facilitate its operations.

Further, one or more user input/output devices may be used with controller node 106, including, but not limited to, one or more displays, such as displays provided on lap-top computers, tablets, smart-phones, and other devices, virtual reality goggles, holographic displays, and other display technologies, printers such as two-dimensional and three-dimensional printers, and other information processing and/or presentation devices and technologies. The displays may be configured to present information to users in one or more frames or windows, and using one more display devices. Examples of other user input/output devices that may be used with controller node 106 include, but are not limited to, keyboards, voice command and response systems, styluses, displays, and otherwise.

Communications Links 108

For at least one embodiment, one or more first communications links 108, such as first communication link 108-1, second communication link 108-2, third communication link 108-3, and nth communication link 108-N, may be established using common cellular communications technologies including, but not limited to, 3G/4G/5G technologies. For at least one embodiment, one or more first communications links 108 may be established using any desired communications technology of which non-limiting examples include Ethernet, the Internet, private networks, public networks, the plain old telephone service (POTS), microwave links, fiber-optics, wireless, wired, cellular, other networking communications technologies, and/or combinations thereof. The communications links 108 may include use of any desired communications technologies. It is to be appreciated that a given sensor 104 may use a different communications technology than another sensor 104. For at least one embodiment, a communications link 108 may utilize cellular communications frequencies and technologies in the six hundred to eight hundred megahertz (600-800 MHz) bands. It is commonly appreciated that lower frequencies, as compared for example to cellular frequencies used in the two giga-herz (2 GHz) bands, facilitate communication of data over distances up to fifty kilometers (50 kM) or more, when unimpeded by obstacles such as topography, buildings, interfering signal sources, or the like.

For at least one embodiment, a second sensor 104-2 may be communicatively coupled with a third sensor 104-3, which is communicatively coupled to a controller node 106. Such a configuration may be desirable, for example, when a sensor 104 is located in an area with respect to which wired, wireless, satellites, or the like communications are not feasible. As shown, the second communications link 108-2 may be indirectly coupled to a controller node 106 by the third communications link 108-3. Mesh networks, ring networks, peer-to-peer, and other topologies may be used for any given implementation of an embodiment of the present disclosure to communicatively couple a sensor 104 with a controller node 106. A given communications link 108 may be uni-directional, as shown for purposes of example with respect to the first communications link 108-1, and/or bi-directional as shown for purposes of example only with respect to the other communications links.

Warning Signs 110

As further shown in FIG. 1, one or more hazard identification devices (herein, "warning signs") 110 may be used. Warning signs 110 may take any desired form. Non-limiting examples of warning signs 110 include road-side message boards, adjustable speed limiting signs, flashing lights, warnings provided by travel application programs executing on a user device, such as a smartphone, where non-limiting examples of such travel application programs include WAZE, GOOGLE MAPS, ANDROID DRIVE, APPLE DRIVE, and the like. A warning sign 110 is configured to provide sufficient information (a "warning") to a user that a hazardous condition presently exists or may exist (e.g., the detected conditions then being ripe) in an upcoming portion 102 of a road. Warning signs may also be used to inform users when hazardous conditions cease to exist.

It is to be appreciated that the nature of a given (actual or potential) hazard may result in different warnings and/or warning signs being used. For at least one embodiment, a warning sign 110 may be configured to communicate sufficient information for a user to take appropriate actions in view of the given (actual or potential) hazard. For example and not by limitation, a black-ice hazard may result in a warning sign that both identifies the hazard and reduces a posted speed limit. By further example, a high-wind warning may result in a warning sign that informs users of high profile vehicles (e.g., those exceeding three (3) meters in height) that further travel is unsafe, not advised, prohibited, or otherwise. Warning signs 110 may be located at any desired location relative to a sensor 104 and a portion 102 of a road 100. For autonomous/semi-autonomous vehicles, warning signs 100 may include or not include the communication of humanly perceptible information, computer instructions for use in controlling operation of the vehicle, or otherwise.

Ideally, warning signs 110 are located a sufficient distance prior to a given portion of a road with respect to which at least one sensor 104 has detected an actual or potential hazardous condition exists. For at least one embodiment, warning signs 100 may be located in locations adequate for a user to take appropriate responsive actions in response to a given actual or potential hazard. Non-limiting examples of responsive actions include slowing down (e.g., for atmospheric hazards), deploying chains (e.g., for snow related weather hazards), taking a different route (e.g., for environmental hazards), stopping until the hazard is cleared or otherwise addressed, or otherwise. It is to be appreciated that a responsive action taken by a given user may vary from those taken by another user. A responsive action for a given hazardous condition may vary from another responsive action for a different hazardous condition.

Warning signs 110 may be communicatively coupled directly to a controller node 106 by one of more warning links 112. The warning links 112 may use the same or different communications technologies as used for the communications links 108.

For at least one embodiment, a given sensor 104 may be configured to detect one or more conditions, such as temperature, humidity, wind direction, speed, or the like and report such conditions to the controller node 106. The controller node 106 may be configured to autonomously, semi-autonomously, and/or pursuant to human input, direction, and/or approval determine whether a given condition constitutes an actual or potential hazard, at a given time or period thereof, and for a given portion 102 of a road 100. The controller node 106 may be configured to provide a message, using a warning link 112, to a warning sign 110 that identifies the one or more (actual or potential) hazards and other information regarding the hazard. Such other information may include advice, instruction, or other information which assists the user in navigating and/or otherwise addressing the hazard.

For at least one embodiment, multiple sensors 104 may be used to detect conditions for one or more actual and/or possible hazards along a given portion of a road. For at least one embodiment, where detection of atmospheric conditions is desired, sensors may be located along the given portion at any desired interval. Non-limiting examples of such intervals include every one-hundred meters (100 M), every two-hundred meters (200 M), every kilometer (1 kM), or otherwise. It is to be appreciated that such multiple sensors may be communicatively coupled, with one sensor designated as a master sensor and responsible for aggregating and providing sensor readings to a designated controller node 106. For at least one embodiment, each sensor may independently report its sensor readings to the designated controller node 106. For at least one embodiment, a master sensor may be configured to receive sensor readings from two or more sensors (including itself), process such sensor readings, and based on such processing determine whether actual or ripe conditions exists for one or more hazards. In response to such a determination, the master sensor may be configured to communicate such determinations to one or more designated controllers 106, to one or more vehicles 116 proximate to (e.g., then traversing or soon entering) a given portion of the road, and/or to one or more warning signs 110. For at least one embodiment, a sensor 104 may be configured as a narrow-band Internet of Things (NBIOT) device.

For at least one embodiment, a given sensor 104, such as sensor 104-4 may be configured as an "independent sensor," namely, a sensor configured to independently detect and identify hazardous conditions and generate messages for one or more warning signs 110. When operating in an independent mode, a given sensor 104 is not communicatively coupled to a controller node 106. The given sensor 104 may be directly coupled to one or more warning signs by a direct link 114. The direct link 114 may use the same or different communications technologies as used for the communications links 108 and/or the warning links 112. When directly coupled to warning sign 110, a given sensor 104 may be configured to provide a message to that warning sign 110 that identifies the one or more (actual or potential) hazards. Such message may also include instructions for a user to mititgate the hazardous condition(s).

For at least one embodiment, a controller node 106 and/or an independently operating sensor 104 may be configured to utilize additional information in generating warnings, such information may be provided by sources other than the detected and/or determined readings of one or more sensors. For example, at least one embodiment may include a controller node 106 and/or sensor 104 configured to receive telemetry information from a vehicle 116 transmitting a given portion 102 of the road 100. Non-limiting examples of such telemetry may include the use of braking, braking patterns along the given portion 102, whether traction control mechanisms are employed by the vehicle, driving speeds, changes in driving speeds, size, weight, and other data regarding the vehicle. Such vehicle telemetry may be provided directly and/or indirectly to the controller node 106 and/or to the sensor 104 using a vehicle link 118 that uses any desired communications devices, systems, and technologies including, but not limited to those discussed above with respect to the communications links 108.

Sensor 104

Figure 2:
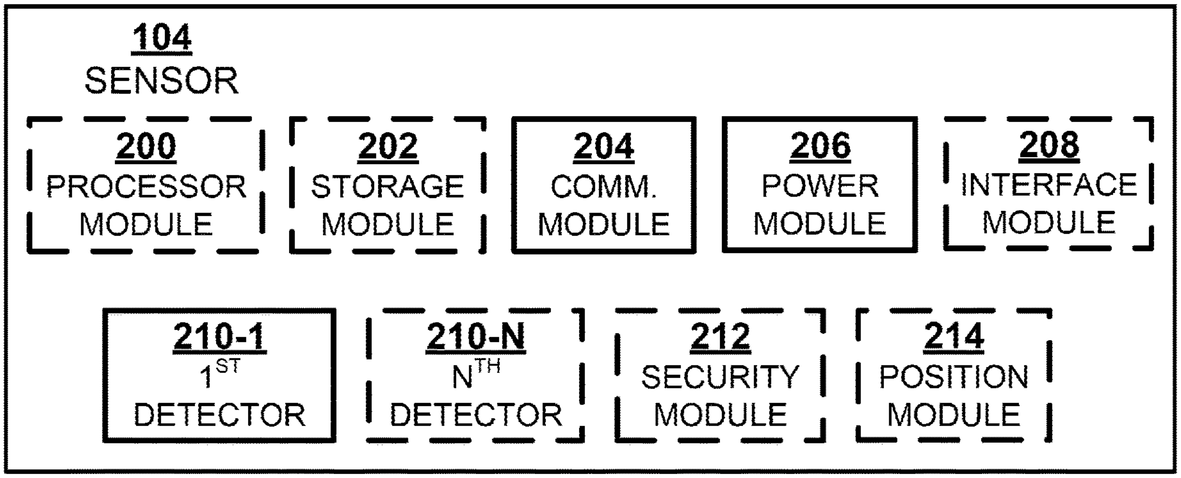
FIG. 2 is a schematic diagram of a sensor used in the system of FIG. 1 and in accordance with at least one embodiment of the present disclosure.

As shown in FIG. 2 and for at least one embodiment of the present disclosure, a sensor 104 may be configured to include a processor module 200, a storage module 202, a communications module 204, a power module 206, an interface module 208, one or more detectors 210-1 to 210-N configured to generate "readings" (for example and not limited to, one or more temperature readings), a security module 212, and an optional position module 214. Other modules may be included or excluded in one more embodiments.

For at least one embodiment, a sensor 104 may be configured to simply report detected conditions (e.g., temperature and humidity readings) as detected data to a controller node 106. Such reporting may occur on an as arising, periodic, or other basis. Such reporting may occur without a sensor 104 being configured to perform limited, if any, data processing, storage, or other operations. Accordingly, for at least one embodiment, one or more of the processor module 200, storage module 202, interface module 208, security module 212, and/or position module 214 may not be needed to support limited data reporting operations by a given sensor 104. In accordance with at least one embodiment, a sensor 104 may be configured to minimally include, at least, each of a communications module 204 configured for communicating detected readings to a controller node 106, a power module 206, and at least one detector 210-1.

The various modules may be directly and/or indirectly coupled to each other using any known or later arising intra/inter-device data transfer technologies including, but not limited to, directly wired or wireless connections, universal serial busses, and the like. For at least one embodiment, the one or more detectors 210-1 to 210-N may be located physically with and/or physically distant from one or more of the other sensor 104 components. For example, when detection of conditions at multiple locations for a given portions of a road are desired, detectors may be located (remotely) at such various multiple locations. Such remotely located detectors may be communicatively coupled to other sensor components using wired and/or wireless communications technologies including, but not limited to, BLUETOOTH, BLUETOOTH LOW ENERGY (BLE), WIFI, low power radios, software defined radio links, and otherwise.

Sensor: Processor Module 200

For at least one embodiment, the processor module 200 may include one or more hardware components configured for performing one or more data processing operations with respect to readings and to generate one or more "determinations" based on such readings and/or other data and computer instructions. As used herein, a "reading" refers to the one or more outputs generated by a detector. A detector may be configured to perform one or more data processing operations with respect to such one or more readings. Data processing operations performed by sensors, detectors, and/or otherwise may include the execution of one or more computer instructions (as further defined below). The computer instructions may be provided in the storage module 202, provided with the processor module 200 itself, such as in cache or read only memory, as firmware, or otherwise. The processor module 200 may include any configuration of currently available and/or later arising hardware processing elements, including microprocessors, microcontrollers, CPUs, and otherwise. The processor module 200 may be communicatively coupled to each of the elements shown in FIG. 2. Such communicative coupling may occur by use of a system bus, direct connections, indirect connections, or otherwise. The processor module 200 executes computer instructions to facilitate the various features and functions of the sensor 104, as so configured in accordance with one or more embodiments of the present disclosure.

The processor module 200 may be configured to provide any desired data and/or signal processing capabilities. For at least one embodiment, the processor module 200 may have access to one or more non-transitory processor readable instructions, including instructions for executing one or more applications, engines, and/or processes configured to instruct the processor to perform computer executable operations (hereafter, "computer instructions"). The processor module 200 may use any known or later arising processor capable of providing and/or supporting the features and functions of a given sensor 104 as needed for any given intended use thereof and in accordance with one or more of the various embodiments of the present disclosure.

For at least one non-limiting embodiment, the processor module 200 may be configured as and/or has the capabilities of a 32-bit or 64-bit, multi-core ARM based processor. For at least one embodiment, the processor module 200 may use, in whole or in part, one or more backend systems, such as server systems or otherwise. Computer instructions may include firmware and software instructions, and associated data for use in operating a given sensor 104, as executed by the processor module 200. Such computer instructions provide computer executable operations that facilitate one or more features or functions of a given sensor 104 and in accordance with one or more embodiments of the present disclosure.

Sensor: Storage Module 202

For at least one embodiment, the storage module 202 may be configured to store detected data and/or determined data (collectively, "sensor data"), computer instructions, and/or other data on a transient and/or non-transient basis. Whether a given element of sensor data is stored on a transient or non-transient basis may be determined based upon an intended usage of the sensor data, data storage availability, other data storage requirements, whether the sensor data has been previously communicated to the controller node 106, whether the sensor data is current or old (as determined in view of an intended use of such data), and otherwise. It is to be appreciated that any desired data storage technologies, processes, and the like currently available or later arising may be used for one or more embodiments of the present disclosure. For at least one embodiment, the sensor 104 utilizes flash memory storage technologies providing at least two Gigabytes (2 GB) of data storage capability. Other data storage capacities may be used for other embodiments.

Sensor: Communications Module 204

For at least one embodiment, the communications module 204 may include any desired combination of receive, transmit, compression, and other communications technologies. The communications module 204 may be configured to operate in conjunction with the security module 212 to facilitate secure data communications. Any known or later arising communications technologies may be utilized by and/or in conjunction with the communications module 204. The communications module 204 may be configured to provide sensor data to the processor module 200, the controller node 106, or other system components. The providing of such sensor data may occur on any desired timeline, frequency, basis, or otherwise. For example, sensor data may be continual, on an alert, periodically, randomly, on an as queried (or "pulled") basis, or otherwise communicated to the processor module 200 and/or one or more controller nodes 106. For at least one embodiment, sensor data may be communicated to a vehicle proximate to a given portion of a road at which a given sensor 104 has generated detected data. For at least one embodiment, detected data and/or determined data may be communicated to the vehicle by the sensor 104. One or more elements of available sensor data may be communicated at any given time to any desired recipient thereof. For example and for at least one embodiment, temperature data may be communicated continually, while humidity data is communicated on an hourly or other time interval basis.

Sensor: Power Module 206

For at least one embodiment, the power module 206 may provide electrical power to a given sensor 104 using any known or later arising technologies. Non-limiting examples, include line power, wind power, solar power, battery power, or otherwise. The power module 206 may be configured to minimize operations of other sensor 104 components to an as needed, pre-determined, or other basis. For example and not by limitation, the power module 206 may be configured to activate a given temperature detector 210 briefly (for sufficient time to obtain a reliable reading) and on a periodic basis, such as hourly, while being also configured to detect wind speeds continually. It is to be appreciated that the providing of power to other sensor components may also be regulated and controlled by the power module. For example, use of the communications module 204 may be limited to daily, semi-daily sending of pings when detected conditions do not exceed a given one or more thresholds, while being fully powered when timely reporting of conditions is needed to provide a desired warning to users of actually and/or potentially hazardous conditions. For at least one embodiment, the power device 206 may include one or more rechargeable and/or replaceable batteries. Such recharging may occur using line power, such as that provided by solar, wind, or otherwise.

Sensor: Interface Module 208

For at least one embodiment, the interface module 208 may take any desired form and may be configured to receive any desired inputs and provide any desired outputs. For example, inputs may be received from detectors 210 internal and/or external to a given sensor 104, from an operator such as one local/adjacent or remote (e.g., located at a controller node 106) to a given sensor, from another sensor 104, from a process or external system, such as one provided by a controller node 106, or otherwise. Inputs may be provided in any desired manner, such as wirelessly, by wired connection, by human input (including touch inputs, voice commands and otherwise), or otherwise. For at least one embodiments, outputs may be provided in any desired form or manner. For example, outputs may be provided as humanly perceptible tones, images, graphics, indicators (visible, audible, tactile) or otherwise. Likewise, outputs may be provided in device perceptible form (such as in a data format that may not be humanly perceptible absent use of data translation and/or interpretation by use of one or more computing or other devices) to other sensors 104, to one or more controller nodes 106, to one or more vehicles 116, to other systems (such as a National Weather Service system), or otherwise.

Audio I/O Module: Audio I/O modules may be configured to support the providing of audible signals between a sensor 104, a user, a vehicle 116, a controller node 106, or otherwise. Such audio signals may include spoken text, sounds, or any other audible information. Such audible information may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

For at least one embodiment, an audio I/O module generally includes hardware and software (herein, "audio technologies") which supports the input and (as desired) output of audible signals to a user. Such audible signals may include those arising from a given content. Such audio technologies may include technologies for converting human speech to text, text to speech, translation from a first language to one or more second languages, playback rate adjustment, playback frequency adjustment, volume adjustments, and otherwise. Non-limiting examples of audio technologies that may be utilized in an audio I/O module include GOOGLE VOICE, SFTRANSCRIPTION, BRIGHTSCRIPT, GOOGLE ASSISTANT, SIRI, and others.

In at least one embodiment, an audio I/O module may be configured to use one or more microphones and speakers to capture and present audible information to a user. Such one or more microphones and speakers may be provided by a given sensor 104 itself or by a device communicatively coupled to a given sensor 104.

Visual I/O Module: For at least one embodiment, a sensor 104 may include a visual I/O module configured to support the providing of visible signals to a user, a vehicle 116, a controller node 106, or otherwise. Such visible signals may be in any desired form and may be provided, for at least one embodiment by use of a warning sign 110. Such visible information may include one or more of humanly perceptible visible signals.

For at least one embodiment, a visual I/O module generally includes hardware and software (herein, "visible technologies") which supports the input by and (as desired) output of visible signals to a user. Such visible signals may include those arising from a given detected hazard (actual or potential). Such visible technologies may include technologies for converting data into humanly perceptible images or other data forms. A visual I/O module may be configured to use one or more display devices, such as warning signs, configured to present visible information to user. A visual I/O module may be configured to use one or more image capture devices, such as those provided by lenses, digital image capture and processing software and the like which may be provided by a given sensor 104 itself or by a another device communicatively coupled thereto, for example, a remote camera. Accordingly, it is to be appreciated that any existing or future arising visual I/O devices, systems and/or components may be utilized by and/or in conjunction with a sensor 104 to facilitate one or more embodiments of the present disclosure.

Text I/O Module: For at least one embodiment, a sensor 104 may include a text I/O module configured to support the providing of textual information by a sensor 104 to a user, a vehicle 116, a controller node 106, or otherwise. Such textual information signals may be in any desired language, format, character set, or otherwise. Such textual information may include one or more of humanly perceptible characters, such as letters of the alphabet or otherwise. For at least one embodiment, a text I/O module may also be configured to capture textual information in first form, such as a first language, and convert such textual information into a second form, such as a second language. A text I/O module generally includes hardware and software (herein, "textual technologies") which supports the input by and (as desired) output of textual information signals to a user. In at least one embodiment, a text I/O module may be configured to use an input device, such as a keyboard, touch pad, mouse, or other device to capture textual information. It is to be appreciated that any existing or future arising text I/O devices, systems and/or components may be utilized by and/or in conjunction with one or more embodiments of the present disclosure.

Sensor: Detector(s) 210

For at least one embodiment, a sensor 104 may include one or more detectors 210. As discussed above, a given detector 210 may be configured to detect, generate detected data regarding, and otherwise monitor a given location for one or more hazards. Such hazards may be of any type, form, or otherwise. Detected data may be provided in any desired form and may include any desired form of data including, but not limited to, detector readings (e.g., temperature, wind speed, or the like), still images and video images (at any desired wavelengths including, but not limited to, visible light, infrared, or otherwise), sounds recordings at any desired frequency or frequencies, laser, motion or other indicators (such as those used with optical fences to detect migration of wildlife across a road portion), or otherwise. Any known or later arising hazard sensing and detecting technologies may be used in an accordance with an embodiment of the present disclosure. For at least one embodiment where a sensor 104 is configured to detect conditions ripe for the formation of black-ice on a roadway surface, a sensor may be configured to include a temperature detector and a humidity detector. For at least one embodiment where a sensor is configured to detect snow conditions, a sensor may include one or more of a snow presence detector, a snow depth detector, a snow density detector, or the like.

Sensor: Security Module 212

For at least one embodiment, a security module 212 may be configured to provide any desired type or level of virtual and/or physical security to a sensor 104 and with respect to sensor data, computer instructions, or other data stored, processed, communicated, generated, or otherwise provided by and/or used by a sensor 104. As used herein "virtual security" refers to the securing of data, data processes, data communications, and the like. Non-limiting examples of virtual security include the use of encryption, passwords, biometric authenticators, and the like. As used herein, "physical security" refers to the securing of a sensor 104 and/or one or more modules thereof using physical mechanisms, such as security banding, tumbler locks, magnetic locks, compression collars, weather sealing, and other technologies that may be used to secure a given sensor 104 from unauthorized access, tampering, external influences (such as weather, animals, humans, or the like), and otherwise. One or more of the various embodiments of the present disclosure may utilize any desired form of known and/or later arising virtual security, physical security, and combinations thereof security measures.

Sensor: Position Module 214

For at least one embodiment, a position module 214 may be used to provide location information for a given sensor 104. As discussed above, such location information may be pre-determined, determined at the time of installation of a given sensor 104, variably determined or otherwise. The location determinations may use any known or later arising location determining technologies.

Figure 3:
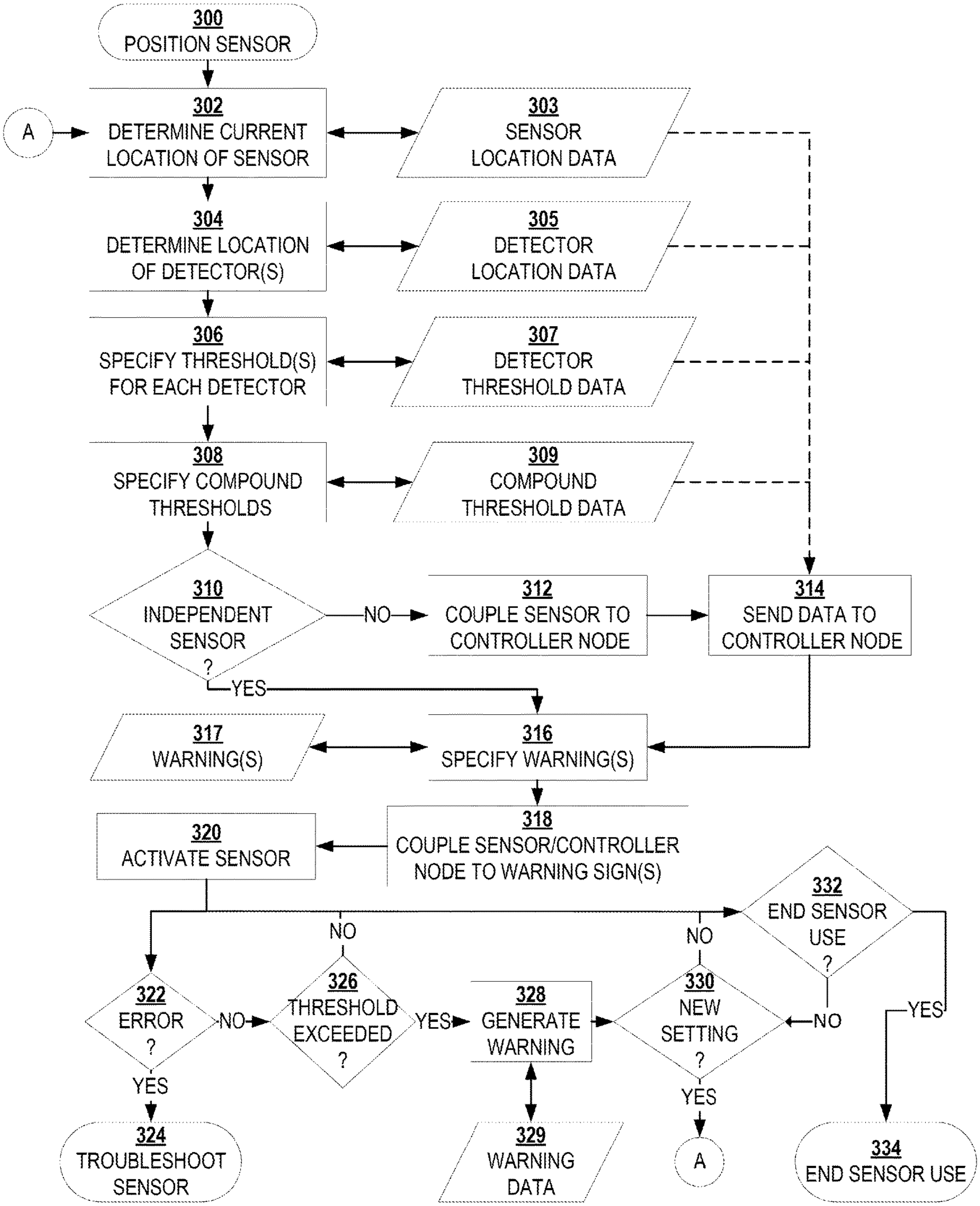
FIG. 3 is a flowchart illustrating a process for determining and communicating hazardous conditions to a user and in accordance with at least one embodiment of the present disclosure.

As shown in FIG. 3 and for at least one embodiment of the present disclosure, a process for determining and communicating hazards conditions to users is shown.

Per Operation 300, the process may include positioning a sensor 104 at a first location. As discussed above, a given sensor may be configured to monitor one or more conditions, for example and not by limitation, air temperature at a given location. The location at which the sensor is positioned may be based upon any criteria, factor, randomly, ad hoc, or otherwise. For example, a sensor may be positioned along one or more portions of a road based upon past incident occurrences, such as vehicles losing control under one or more adverse condition. Likewise, a sensor may be positioned based upon desires to study one or more locations for potential adverse conditions.

Per Operation 302, the process may include determining a current location of the sensor 104. As discussed above, the current position of a given sensor may be determined using any known or later arising location determining devices, system, techniques, or the like. For at least one example, the current location may include one or more of a latitude, longitude, elevation, distance from a mile marker or other fixed reference point, or otherwise.

Per Operation 303, the process may include storing the determined current location of the sensor data in a database or other storage device provided with the sensor, such as storage module 202, and/or in a storage device communicatively coupled to the sensor.

Per Operation 304, the process may include determining a location of one or more detectors. Operation 304 may be useful when one or more detector(s) are separately provided and are configured for use with a given sensor. For example and not by limitation, multiple temperature detectors may be embedded in multiple lanes of a roadway and communicatively coupled to a common sensor, with each detector having a different physical location.

Per Operation 305, the process may include storing the determined current location of each detector data to be associated with a given sensor in a database or other storage device provided with the sensor, such as storage module 202, and/or in a storage device communicatively coupled to the sensor.

Per Operation 306, the process may include specifying one or more thresholds for each detector. It is to be appreciated that the number, type, quantity, and other thresholds specified for a given detector may vary based on detector type, intended detector use, location, warnings desired to be generated, and otherwise. For example and not by limitation, a wind speed detector may be configured to include multiple thresholds, such as a blowing snow (blizzard) threshold, a high vehicle threshold (e.g., specifying when travel by vehicles having a height above a given limitation is not advised), a no transit threshold (e.g., specifying conditions where transit by any vehicle is not advised), and otherwise. It is to be appreciated that a blowing snow (blizzard) hazard may arise under wind speeds less than a high vehicle threshold.

Per Operation 307, the process may include storing the one or more specified thresholds for each detector data in a database or other storage device provided with the sensor, such as storage module 202, and/or in a storage device communicatively coupled to the sensor.

Per Operation 308, the process may include specifying one or more "compound thresholds." As used herein, a "compound threshold" is a threshold for a given hazard that includes two or more detectable conditions. For example, a black-ice condition is an environmental hazard that is detectable when both a given temperature (air and/or road surface) and a humidity level exceed specified thresholds. Accordingly and for at least one embodiment, a "black-ice" compound threshold may be specified which includes temperature detector thresholds and humidity detector thresholds. Similarly, thresholds for a weather hazard, such as a blizzard, may include a compound threshold based upon detected wind speed thresholds, detected snow accumulation/snow precipitation, and the like.

Per Operation 309, the process may include storing the one or more specified compound threshold data for each combination of detectors in a database or other storage device provided with the sensor, such as storage module 202, and/or in a storage device communicatively coupled to the sensor.

Per Operation 310, the process may include determining whether the sensor is an independent sensor. If "yes," the process may proceed to Operation 316. If "no", the process may proceed to Operation 312.

Per Operation 312, the process may include communicatively coupling the sensor to at least one controller node. As discussed above, such communicative coupling may use any desired communications technologies, systems, or the like.

Per Operation 314, the process may include sending the saved data (e.g., data saved as per Operations 303, 305, 307 and 309) to the controller node. It is to be appreciated that other data may also be sent to the controller node including, but not limited to: sensor identifying data (each herein being a "sensor identifier"); identifiers for one or more detectors (each herein being a "detector identifier"); network address or other information used to communicate by and between a given sensor and a controller node such as, but not limited to, a MAC address, an IP address, and a radio frequency address; security data such as, but not limited to, a public-private key (or similar security code, token or the like used to secure communications by and between a given sensor and a given controller node); and any other data useful in facilitating use of an embodiment of the present disclosure.

Per Operation 316, the process may include specifying one or more warnings. When the sensor is an independent sensor, specifying of such one or more warnings may occur via use of an interface module 208 provided by the sensor, via use of warning configuration information provided by another device, such as a lap-top computer coupled to the sensor, via configuration information provided by a controller node then coupled (e.g., for purposes of installation, testing, or otherwise) to the independent sensor, or otherwise. When a non-independent sensor is used, the specifying of one or more warnings may occur using a controller node, such as, but not limited to, a controller node communicatively coupled to a given sensor. In at least one embodiment, a central node may may communicatively coupled to one more controller nodes and such central node may be used to specify one or more warnings.

For at least one embodiment, the specified warning(s) may include a message to be presented in a humanly perceptible form. For at least one embodiment, the specified warning(s) may include data provided in a device perceptible form. For at least one embodiment, the specified warning(s) may include an identification of a warning sign to be used to communicate the message to a user.

Per Operation 317, the process may include storing the one or more specified warnings in a database accessible to one or more of the controller node, the sensor, or otherwise. For at least one embodiment, such as when a sensor is configured to operate as an independent sensor, the process may include storing the one or more specified warnings in a database or other storage device provided with the sensor, such as storage module 202, and/or in a storage device communicatively coupled to the sensor.

Per Operation 318, the process may include communicatively coupling at least one of the sensor (for example, when an independent sensor is being used) and/or the controller node with a warning sign. As discussed above, such communicative coupling may use any desired communications technologies, systems, or the like. It is to be appreciated that a given sensor may be configured to operate dependently and/or independently for any or no reason, including, but not limited to, whether a communications link 108 is or is not operable, time of day, or otherwise.

Per Operation 320, the process may include activating the sensor. It is to be appreciated that a given sensor may be activated for use during all times, during limited time periods, during certain periods of a year, (e.g., blizzard sensor activated during the winter and not during the summer), or otherwise.

Per Operation 322, the process may include monitoring the sensor for one or more errors. For an independent sensor, such monitoring may occur using one or more internal, self-diagnostic checking routines. For non-independent sensors, such monitoring may include use of periodic status checks by and/or between the sensor and a controller node. Such status checks may use any desired format, periodicity, or the like. When an error is detected, the process may continue with Operation 324, otherwise, the process may continue with Operation 326.

Per Operation 324, when an error with a given sensor is detected, the process may include troubleshooting the sensor. Such troubleshooting may occur remotely, automatically, semi-automatically, manually, or otherwise. For at least one embodiment, a troublesome sensor may be configured into a fail-safe condition where a specified message may be generated by one or more warning signs coupled to the sensor. For example, in an area prone to the formation of black-ice, a fail-safe message may be presented on a warning sign indicating the same.

Per Operation 326, the process may include determining whether a detector reading indicates that a given threshold has been exceeded. For independent sensors, such determining may occur at the sensor itself. For non-independent sensors, such determining may occur in whole or in part in one or more of the sensor and the controller node. It is to be appreciated that Operation 326 may occur on any basis including, but not limited to, real-time, randomly, per a schedule, periodically, or otherwise. When a threshold has not been detected, the process may continue with Operation 322 and/or 332 until either an error is detected (per Operation 322) or an end of use for the sensor is specified (per Operation 332). When a threshold has been exceeded, the process may continue with Operation 328.

Per Operation 328, the process may include generating one or more warnings and providing such warnings to a warning sign, or otherwise—as discussed above.

Per Operation 329, the process may include storing the one or more warnings, as "warning data", in a database or other storage device provided with the sensor, such as storage module 202, in storage device provided by the controller node, or in another database communicatively coupled to one or more of the sensor and/or the controller node.

Per Operation 330, the process may include determining whether a new setting is to be used with a given sensor or component thereof. If so, the process may continue with one or more of Operations 302-320, as appropriate.

Per Operation 332, the process may include determining whether use of the sensor is to end. It is to be appreciated that the end of use of a given sensor may be permanent, temporary or otherwise. When temporary, Operation 330 or the like may be used to reactivate a sensor with new or pre-existing settings (as appropriate).

It is to be appreciated that the process flow shown in FIG. 3 and discussed above is for illustrative purposes only and is not to be considered limiting an embodiment of the present disclosure or an implementation thereof to any specific sequence of operations.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A non-transitory machine-readable storage medium, having stored thereon computer instructions for execution by a hardware processor, comprising:

receiving, from a first detector, a first detector reading;

wherein the first detector reading detects a first condition on a first portion of a road;

determining whether the first detector reading exceeds a first threshold;

when the first detector reading exceeds the first threshold, determining that a hazardous condition potentially exists along the first portion of the road;

receiving, from a second detector, a second detector reading;

wherein the second detector reading detects a second condition on the first portion of the road;

wherein the second condition is different than the first condition;

determining whether the second detector reading exceeds a second threshold;

when the second detector reading exceeds the second threshold, further determining that the hazardous condition potentially exists along the first portion of the road; and generating a warning message in view of at least one of the first detector reading exceeding the first threshold and the second detector reading exceeding the second threshold.

2. The non-transitory machine-readable storage medium of claim 1, wherein the first detector reading is received from a first sensor; and wherein the second detector reading is received from the first sensor.

3. The non-transitory machine-readable storage medium of claim 1, wherein at least one of the first threshold and the second threshold are adjustable.

4. A non-transitory machine-readable storage medium, having stored thereon computer instructions for execution by a hardware processor, comprising:

receiving, from a first detector, a first detector reading;

wherein the first detector reading detects a first condition of a first portion of a road;

determining whether the first detector reading exceeds a first threshold;

when the first detector reading exceeds the first threshold, determining that a hazardous condition potentially exists along the first portion of the road;

receiving, from a second detector, a second detector reading;

wherein the second detector reading detects a second condition of the first portion of the road;

determining whether the second detector reading exceeds a second threshold;

when the second detector reading exceeds the second threshold, further determining that the hazardous condition potentially exists along the first portion of the road; and generating a warning message in view of the first detector reading exceeding the first threshold and the second detector reading exceeding the second threshold; and wherein the computer instructions are non-transitorily stored in a computer readable medium and executed by a hardware processor provided by a controller node of a road condition warning system.

5. The non-transitory machine-readable storage medium of claim 4, wherein the computer instructions further comprise:

coupling the controller node to a warning sign; and communicating the warning message to the warning sign.

6. The non-transitory machine-readable storage medium of claim 5, wherein the warning sign is an application program executable by a user device.

7. The non-transitory machine readable storage medium of claim 6, wherein the application program is a travel application program.

8. The non-transitory machine-readable storage medium of claim 5, wherein the warning sign further comprises a highway message board.

9. A non-transitory machine-readable storage medium, having stored thereon computer instructions for execution by a hardware processor, comprising:

receiving, from a first detector, a first detector reading;

wherein the first detector reading detects a first condition of a first portion of a road;

determining whether the first detector reading exceeds a first threshold;

when the first detector reading exceeds the first threshold, determining that a hazardous condition potentially exists along the first portion of the road;

receiving, from a second detector, a second detector reading;

wherein the second detector reading detects a second condition of the first portion of the road;

determining whether the second detector reading exceeds a second threshold;

when the second detector reading exceeds the second threshold, further determining that the hazardous condition potentially exists along the first portion of the road;

generating a warning message in view of the first detector reading exceeding at least one of the first threshold and the second detector reading exceeding the second threshold;

wherein the computer instructions are non-transitorily stored in a computer readable medium and executed by a hardware processor provided by a controller node of a road condition warning system; and outputting the warning message as:

a first warning message when the first detector reading exceeds the first threshold while the second detector reading does not exceed the second threshold;

as a second warning message when the second detector reading exceeds the second threshold while the first detector reading does not exceed the first threshold; and as a third warning message when the first detector reading exceeds the first threshold and the second detector reading exceeds the second threshold.

10. The non-transitory machine-readable storage medium of claim 9, wherein the first warning message warns of fog conditions;

wherein the second warning message warns of freezing conditions; and wherein the third warning message warns of black-ice condition.

11. A non-transitory machine-readable storage medium, having stored thereon computer instructions for execution by a hardware processor, comprising:

receiving, from a first detector, a first detector reading;

wherein the first detector reading detects a first condition of a first portion of a road;

determining whether the first detector reading exceeds a first threshold;

when the first detector reading exceeds the first threshold, determining that a hazardous condition potentially exists along the first portion of the road;

receiving, from a second detector, a second detector reading;

wherein the second detector reading detects a second condition of the first portion of the road;

determining whether the second detector reading exceeds a second threshold;

adjusting the second threshold based on the first reading;

when the second detector reading exceeds the second threshold, further determining that the hazardous condition potentially exists along the first portion of the road; and generating a warning message in view of the first detector reading exceeding at least one of the first threshold and the second detector reading exceeding the second threshold;

wherein the first detector reading is received from a first sensor; and wherein the second detector reading is received from a second sensor.

12. A non-transitory machine-readable storage medium, having stored thereon computer instructions for execution by a hardware processor, comprising:

receiving, from a first detector, a first detector reading;

wherein the first detector reading detects a first condition of a first portion of a road;

determining whether the first detector reading exceeds a first threshold;

when the first detector reading exceeds the first threshold, determining that a hazardous condition potentially exists along the first portion of the road;

receiving, from a second detector, a second detector reading;

wherein the second detector reading detects a second condition of the first portion of the road;

determining whether the second detector reading exceeds a second threshold;

adjusting the second threshold based on the first reading;

when the second detector reading exceeds the second threshold, further determining that the hazardous condition potentially exists along the first portion of the road; and generating a warning message in view of the first detector reading exceeding at least one of the first threshold and the second detector reading exceeding the second threshold;

wherein the first detector is a humidity detector and the first detector reading is a humidity level;

wherein the second detector is a thermometer and the second detector reading is an air temperature; and wherein the computer instructions further comprise:

determining that a fog hazardous condition potentially exists along the first portion of the road when the first detector reading indicates that the humidity level is at dew point and the second detector reading indicates that the air temperature is within two-point-five degrees Celsius (2.5° C.) of the dew point.

13. A controller comprising:

a communications interface;

a non-transitory machine-readable storage medium storing computer instructions for a road warning system;

a hardware processor, coupled to the communications interface and the non-transitory machine readable storage medium, which when executing the computer instructions configures the controller to perform operations comprising:

receiving a first reading from a first detector;

wherein the first detector generates the first reading; and wherein the first reading is indicative of a first condition;

retrieving, from the non-transitory machine-readable storage medium, a first threshold for the first condition;

first determining whether the first reading exceeds the first threshold;

when the first threshold is exceeded, generating a first warning indicating that the first condition exists;

activating a second detector;

wherein the second detector generates a second reading; and wherein the second reading is indicative of a second condition;

retrieving, from the non-transitory machine-readable storage medium, a second threshold for the second condition;

adjusting the second threshold based on the first reading;

receiving the second reading from the second detector;

second determining whether the second reading exceeds the second threshold; and when the second threshold is exceeded, generating a second warning indicating that the second condition exists.

14. The controller of claim 13, wherein the first threshold is a high wind threshold;

wherein the first determining indicates the high wind threshold has been exceeded;

wherein the second reading indicates a height of a vehicle;

wherein the second threshold specifies a wind to vehicle height relationship; and wherein the first warning indicates high winds may exist at a given location along a portion of a road; and wherein the second warning provides a high wind warning to vehicle when the second threshold is exceeded.

15. The controller of claim 14, wherein the first detector is associated with a first sensor located at a first location along the road;

wherein the second detector is associated with the vehicle and indicates a current location of the vehicle; and wherein the first warning and the second warning are communicated to the vehicle prior to the vehicle arriving at the first location.

16. The controller of claim 15, wherein the operations further comprise:

receiving a third reading from a third detector;

wherein the third reading indicates a current speed of the vehicle;

retrieving, from the non-transitory machine-readable storage medium, a third threshold; and wherein the third threshold is a compound threshold specifying at least one current speed to vehicle height to wind speed relationship; and generating a third warning specifying a maximum speed limit when the compound threshold is exceeded.

17. A system comprising:

a user device comprising:

a first processor executing non-transitory computer instructions for a travel application program;

wherein the travel application program performs operations comprising:

determining a current location of the user device on a road the user device is currently traveling;

receiving a warning message; and in view of the current location, presenting or not presenting the warning message; and a sensor comprising:

a first detector that outputs a first reading indicative of a first condition;

a second detector that outputs a second reading indicative of a second condition;

a non-transitory storage module non-transitorily storing a first threshold, a second threshold, a first warning message, a second warning message; and second non-transitory computer instructions;

a communications module communicatively coupling the sensor with the user device; and a processor, communicatively coupled to the first detector, the second detector, the storage module, and the communications module, executing the second non-transitory computer instructions for:

first determining whether the first reading exceeds the first threshold;

second determining whether the second reading exceeds the second threshold; and communicating the warning message, to the user device, based on results from the first determining and the second determining.

18. The system of claim 17, wherein the warning message further comprises a message to be presented by the travel application program to a user of the user device when the user device is at least one of at a given portion of the road or within a given distance of the given portion of the road; and wherein the travel application program, based upon warning message and the current location of the user device, presents a relevant warning to the user.

19. The system of claim 18, wherein the relevant warning is communicated to the user device as a text message; and wherein the relevant warning indicates a hazardous condition exists at the current location, at one or more upcoming portions of the road, or at the current location and the one or more upcoming portions of the road.

* * * * *